UNITED STATES PATENT OFFICE.

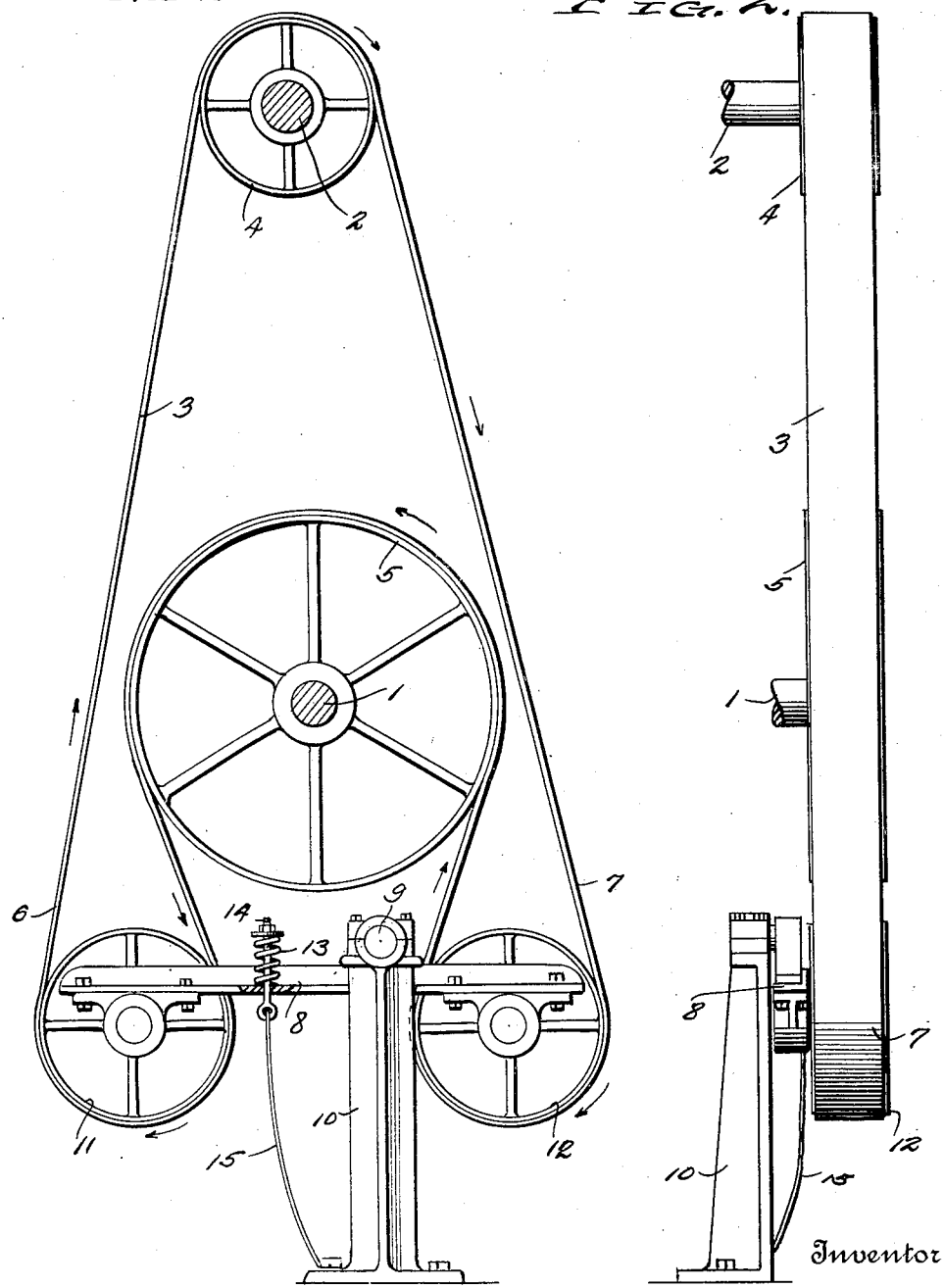

JOHN A. HEANEY, OF MARTINEZ, CALIFORNIA.

BELT-TIGHTENER.

1,320,044.  Specification of Letters Patent.  Patented Oct. 28, 1919.

Application filed January 22, 1919. Serial No. 272,498.

*To all whom it may concern:*

Be it known that I, JOHN A. HEANEY, a citizen of the United States, residing at Martinez, in the county of Contra Costa and State of California, have invented certain new and useful Improvements in Belt-Tighteners, of which the following is a specification.

This invention is primarily designed to prevent hot bearing to obviate waste of lubricant to prolong the life of a drive belt and to minimize the strain on parts to be driven.

In accordance with the present invention a drive belt is mounted to automatically tension the same proportionate to the load when the belt is in operation and to relieve the belt of all tension and the machinery of strain when the belt is at rest.

The invention consists primarily of a pivoted beam or like part provided with two pulleys mounted thereon at unequal distances from the fulcrum of the beam, said pulleys having the driven belt fastened therearound, the pull being arranged to be imparted to the pulley disposed nearer the fulcrum of the said beam.

The drawing illustrates a preferred embodiment of the invention; however, it is to be understood that in adapting the same to meet different conditions, various changes in the form, proportion, and minor details of construction may be resorted to without departing from the nature of the invention as claimed hereinafter.

Referring to the drawings hereto attached,

Figure 1 is a detail view of a drive belt supported in accordance with the invention.

Fig. 2 is a view of the parts shown in Fig. 1 as seen in a direction at a right angle thereto.

Corresponding and like parts are referred to in the following description and indicated in both views of the drawing by like reference characters.

The numeral 1 designates a drive shaft which may be connected with any suitable source of power for operating the machinery to be driven. The numeral 2 indicates the driven shaft from which power may be taken for operating the machine or part to be driven. The drive belt 3 passes over pulleys 4 and 5 secured to the respective shafts 2 and 1 and is of sufficient length to provide loops 6 and 7 at the sides of the drive pulley 5.

A beam 8 or like part is pivotally mounted at 9 upon a suitable support 10 which as shown consists of a post. Pulleys 11 and 12 are mounted upon the beam 8 at different distances from the fulcrum of said beam. As shown the axis of the pulley 11 is about twice the distance from the fulcrum of the beam 8 as the axis of the pulley 12. It will thus be understood that movement of the pulley 12 toward the drive pulley 5 results in a movement of the pulley 11 away from the pulley 5 and because of the different distances of the axis of the pulleys 11 and 12 from the fulcrum of the beam 8 the pulley 11 moves a greater distance than the pulley 12. The loops 6 and 7 of the drive belt 3 pass around the respective pulleys 11 and 12. It is assumed that the drive belt 3 is driven so that the up-pull is on the pulley 12, as indicated by the arrow in Fig. 1, hence the pulley 12 is drawn toward the pulley 5, thereby resulting in a movement of the pulley 11 away from the pulley 5 and because of the difference in movement between the two pulleys 11 and 12 the drive belt 3 will be tensioned, the degree of tension being proportionate to the up-pull on the pulley 12 which is controlled by the load on the pulley 5. The greater the load on the drive pulley 5 the greater will be the up-pull on the pulley 12 and the tension on the drive belt 3. When the drive pulley 5 is at rest the belt 3 will be relieved of tension because there will be no up-pull on that part of the belt between the pulleys 5 and 12, hence the driven belt will assume a position so as to be free from strain, thereby preventing tension thereon and relieving the machinery of strain. However, the instant the drive pulley 5 is set in motion there is a pull on that portion of the drive belt between the pulleys 5 and 12 which tends to draw the pulley 12 toward the pulley 5 and to move the pulley 11 away from the pulley 5, whereby the drive belt is tensioned proportionately to the load as will be readily understood.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

When the load is released there is usually a sudden movement of the beam 8 when the tension throughout the belt is equalizing. To prevent a rebound of the long arm of the equalizing beam 8 to such an extent as to cause the pulley 11 to strike the pulley 5, buffer means are provided and the same may be of any construction and arrangement. As shown an expansible helical spring 13 is mounted upon the beam 8 and a rod 14 passes therethrough and loosely through the beam 8 and is connected by a cord or like part 15 with the support 10 or like part. It is also observed that the beam 8 may be supported in any manner other than by a single standard 10.

Having thus fully described my invention, what I claim as new and desire to secure by Letters Patent is:—

1. In combination, upper and lower pulleys, a drive belt supported on the pulleys and having looped portions at each side of the lower pulley, a beam disposed below the lower pulley and pivotally supported at different distances from its ends, pulleys mounted on the ends of the beam and disposed in the looped portions of the drive belt, and means to prevent a rebound of the beam, the same comprising a check and a spring.

2. In combination, upper and lower pulleys, a drive belt supported on the pulleys and having looped portions at each side of the lower pulley, a beam disposed below the lower pulley and pivotally supported at different distances from its ends, pulleys mounted on the ends of the beam and disposed in the looped portions of the drive belt, an expansible helical spring mounted on an end portion of the beam, a rod passing through said spring and beam and a flexible connection between the rod and a suitable support.

In testimony whereof I affix my signature in presence of two witnesses.

JOHN A. HEANEY.

Witnesses:
W. N. JONES,
E. J. THAYER.

Copies of this patent may be obtained for five cents each, by addressing the "Commissioner of Patents, Washington, D. C."